Oct. 31, 1939.   W. R. RAMSAUR   2,177,995
METHOD OF BRAZING AND WELDING TUBES
Filed April 5, 1937

Inventor
WALTER R. RAMSAUR
By A. S. Kroth
Attorney

Patented Oct. 31, 1939

2,177,995

UNITED STATES PATENT OFFICE 2,177,995

METHOD OF BRAZING AND WELDING TUBES

Walter R. Ramsaur, Racine, Wis., assignor to Young Radiator Company, Racine, Wis.

Application April 5, 1937, Serial No. 135,040

3 Claims. (Cl. 113—112)

This invention relates to a method of brazing or welding tubes as commonly used on radiators, condensers, evaporators, heating coils, and the like and has for its object making a brazed or welded joint without the accumulation or formation of oxide scale on the inside of the tube, caused by the presence of air in the tube and heating the tube from the exterior at the joint to an oxidizing temperature.

I accomplish the desired objectives by clearing the tube of all air or oxide forming gas by passing therethrough another gas other than air which by selection may be an inflammable or a noninflammable gas, such as hydrogen, carbon-monoxide, or regular city gas and the like, and after all air is swept from the tubes, to then permit a reduced quantity to flow through the tubes during the brazing or welding operation.

In making use of the present invention I have found that the ordinary city gas is quite satisfactory because when used there is little or no oxide formed on the inside of the tubes.

Oxide scale is objectionable in any event but it is particularly objectionable when left in condensers and evaporators because it tends to get into the delicately balanced valves and cause leaks which is a serious matter.

It has been the custom in the past to attempt to clear the tubes of oxide scale by the use of a pickling acid. This, however, is not very satisfactory and does not insure against collection of the oxide scale in sharp offsets or pockets.

This invention has to do with any means of clearing the tubes of air and at the same time filling the tubes with a gas which will not support or cause oxidation, and providing means for regulating the flow during the brazing or welding operation.

To these and other useful ends my invention consists of methods and parts and combinations as described and claimed and shown in the accompanying drawing in which:

Figure 2:
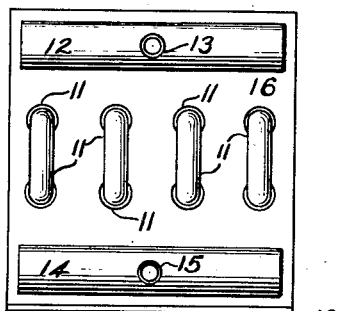
Fig. 2 is an end view of the device shown in Figure 1.
Figure 3:
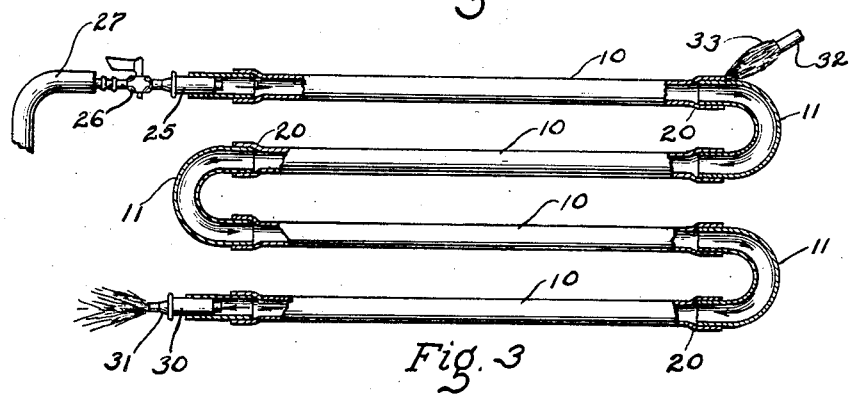
Fig. 3 is a partially sectioned view of a single coil similar to the individual coil shown in Figure 1.

In evaporators it is customary to connect the tubes in series multiple by means of end loops, that is, 2, 3, 4, or more tubes may be spaced in parallel relation and connected so as to form a single sinuous path for the condensate. In the figures, 10 designates the individual tubes. Each set of tubes in a single coil is connected together by means of loops 11. Thus as illustrated in Figure 2 there are provided 4 sets of coils each in separate series. These series are preferably connected together at the inlet end by means of a header 12 having a single inlet 13, or the connections to the inlet end of tubes 10 may be otherwise made.

For example, a separate distributing head may be provided having outlet tubes which lead to their respective coils. The outlet ends of the individual coils are preferably provided with a single header 14 having a common outlet 15. A multiplicity of closely spaced fins 16 is provided through which the tubes extend, and it is customary to provide header plates 17 forming means for supporting the coils.

Thus I have shown a conventional evaporator coil wherein the ends of the tubes 10 are enlarged as at 20 so the ends of loops 11 may be inserted in the openings thus formed, the tubes and loops being preferably of the same diameter and wall thickness. Thus when the loop ends are inserted in the enlarged members 20, there will be provided a continuous opening of the same diameter throughout the length of each coil.

In the present invention I supply preferably a fitting 25 having a valve 26 being made suitable at its inlet side for the reception of a flexible tube 27 having a connection to the source of supply. Member 25 may be tapered or have adapters thereby making it convenient to make a close fitting joint in any sized tube end.

I provide another adapter 30 having a reduced outlet as at 31. I illustrate the fraction of a blow torch 32 and the flame from the torch as 33. Before applying the flame for the brazing operation I open valve 26 and permit the gas to surge through the coil clearing it of all air. After the coil has been cleared of air the valve may be partially closed and the gas escaping at 31 may be ignited. From the size of the flame at 31 the operator will be able to reduce the flow of gas to a point where the flame is barely maintained. After which the flame 33 is applied to the joint and the brazing operation completed in the usual manner.

Figure 1:
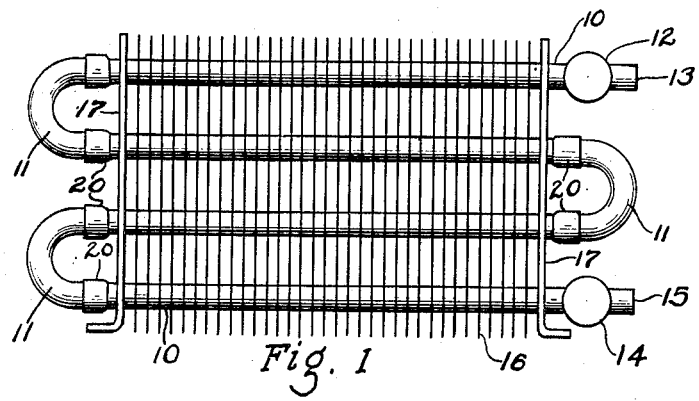
Fig. 1 is a side elevation of one form of evaporator coil on which my method of brazing may be successfully used.

Therefore when welding the joints of an assembly as illustrated in Figures 1 and 2, the gas must obviously be caused to surge through all of the coils simultaneously.

Clearly my invention may be used for welding or brazing steel tubes or tubes of any material upon which a scale is formed when heated to a high temperature in the presence of air within the tube.

Having thus shown and described my invention I claim:

1. A process of welding a telescoped tube joint consisting first of forming a reduced outlet at one end of the tube and inserting a gas supply valve fitting in the other end, next in forcing the air out of the tube by means of a surge of gas, next igniting the gas discharged from the reduced end, then welding the joint while the flow of gas is continued by applying heat and bonding material to the exterior of the joint.

2. A process of brazing telescoped tube ends consisting first in making a gas connection to one end of the assembly, then forcing the air from the tubes by a surge of gas, next igniting the gas at the outlet, next reducing the flow of gas to a minimum flame and then applying heat and bonding material at the joint from the exterior thereof.

3. A process for brazing the telescoped tube joints of a coil of tubes consisting first in making a gas connection at one end of the coil, then forcing the air from the coil by means of a surge of gas therethrough, next reducing the flow of gas through the coil to a predetermined point, then welding the joint by applying heat and bonding material to the exterior thereof.

WALTER R. RAMSAUR.